(12) United States Patent
Kammachi Sreedhar et al.

(10) Patent No.: US 11,477,489 B2
(45) Date of Patent: Oct. 18, 2022

(54) APPARATUS, A METHOD AND A COMPUTER PROGRAM FOR VIDEO CODING AND DECODING

(71) Applicant: Nokia Technologies Oy, Espoo (FI)

(72) Inventors: Kashyap Kammachi Sreedhar, Tampere (FI); Emre Baris Aksu, Tampere (FI); Lukasz Kondrad, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/223,619

(22) Filed: Apr. 6, 2021

(65) Prior Publication Data
US 2021/0314626 A1 Oct. 7, 2021

Related U.S. Application Data

(60) Provisional application No. 63/006,259, filed on Apr. 7, 2020.

(51) Int. Cl.
*H04N 19/70* (2014.01)
*H04N 19/162* (2014.01)
*H04N 19/184* (2014.01)

(52) U.S. Cl.
CPC .......... *H04N 19/70* (2014.11); *H04N 19/162* (2014.11); *H04N 19/184* (2014.11)

(58) Field of Classification Search
CPC .... H04N 19/70; H04N 19/162; H04N 19/184; H04N 21/23439; H04N 21/2362;
(Continued)

(56) References Cited

U.S. PATENT DOCUMENTS

| 11,218,715 | B2* | 1/2022 | Wang | G06T 3/0087 |
| 2021/0235058 | A1* | 7/2021 | Yip | H04N 21/234345 |
| 2021/0295567 | A1* | 9/2021 | Lee | H04N 19/176 |

FOREIGN PATENT DOCUMENTS

| WO | 2017/205504 A1 | 11/2017 |
| WO | 2020/053477 A2 | 3/2020 |

OTHER PUBLICATIONS

"Draft Text of ISO/IEC DIS 23090-10 Carriage of Video-based Point Cloud Compression Data", Systems, ISO/IEC JTC1/SC29/WG11, N19066, Feb. 21, 2020, pp. 1-46. (Year: 2020).*
(Continued)

*Primary Examiner* — Maria E Vazquez Colon
(74) *Attorney, Agent, or Firm* — Joseph C. Drish; Harrington & Smith

(57) ABSTRACT

A method comprising: writing, in a container file, a first video-based point cloud compression (V-PCC) bitstream and a second V-PCC bitstream, wherein said first and second V-PCC bitstreams are associated with a common group based on at least one logical context; writing, in the container file, an indication about the common group between the first V-PCC bitstream and the second V-PCC bitstream; generating a media presentation description (MPD) file with a first representation belonging to a first adaptation set associated with the first V-PCC bitstream and a second representation belonging to a second adaptation set associated with the second V-PCC bitstream; and writing, in the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives upon rendering.

22 Claims, 7 Drawing Sheets

(58) Field of Classification Search
CPC ........... H04N 21/2365; H04N 21/4345; H04N 21/4347; H04N 21/816; H04N 21/85406
See application file for complete search history.

(56) References Cited

OTHER PUBLICATIONS

"Text of ISO/IEC CD 23090-10 Carriage of PC Data", ISO/IEC JTC 1/SC 29/WG 11, N18606, Aug. 23, 2019, pp. 1-19 (Year: 2019).*

"Information Technology—Coding of Audio-visual Objects—Part 12: ISO Base Media File Format", ISO/IEC 14496-12, Fifth Edition, Dec. 15, 2015, 248 pages.

"3rd Generation Partnership Project;Technical Specification Group Services and System Aspects;Transparent end-to-end Packet-switchedStreaming Service (PSS); Protocols and codecs(Release 15)", 3GPP TS 26.234, V15.1.0, Sep. 2018, pp. 1-174.

"Information technology—Dynamic Adaptive Streaming over HTTP (DASH)—Part 1: Media Presentation Description and Segment Formats", ISO/IEC 23009-1, Second Edition, May 15, 2014, 152 pages.

"Text of ISO/IEC DIS 23090-5 Video-based Point Cloud Compression", Coding of moving pictures and audio, ISO/IEC JTC 1/SC 29/WG 11 N18670, 3DG, Oct. 10, 2019, 185 pages.

"Text of ISO/IEC DIS 23090-12 MPEG Immersive Video", MPEG Video Coding, ISO/IEC JTC 1/SC 29/WG 4 N00049, Jan. 29, 2021, 82 pages.

"Text of ISO/IEC CD 23090-10 Carriage of PC Data", Coding of moving pictures and audio, ISO/IEC JTC 1/SC 29/WG 11 N18606, Systems, Aug. 23, 2019, pp. 1-21.

"Draft Definition of MPEG-I phase 2a", Coding of moving pictures and audio, ISO/IEC JTC 1/SC 29/WG 11 N18797, Requirements, Jul. 12, 2019, 4 pages.

"Information technology—Coded Representation of Immersive Media—Part 5: Video-based Point Cloud Compression", ISO/IEC 23090-5:2019, ISO/IEC JTC 1/SC 29/WG 11, 2019, 209 pages.

Moats, "URN Syntax", RFC 2141, Network Working Group, May 1997, pp. 1-8.

Berners-Lee et al., "Uniform Resource Identifier (URI): Generic Syntax", RFC 3986, Network Working Group, Jan. 2005, pp. 1-61.

"Information Technology—Coding Of Audio-Visual Objects—Part 15: Advanced Video Coding (AVC) File Format", ISO/IEC 14496-15, First edition, Apr. 15, 2004, 29 pages.

"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual And Multimedia Systems, Infrastructure of audiovisual services—Coding of moving video, Recommendation ITU-T H.265, Feb. 2018, 692 pages.

Zakharchenko, "V-PCC Codec description", ISO/IEC JTC1/SC29/WG11 MPEG2018/N18017, 3DG, Oct. 2018, 33 pages.

International Search Report and Written Opinion received for corresponding Patent Cooperation Treaty Application No. PCT/FI2021/050211, dated Sep. 2, 2021, 13 pages.

"Draft Text of ISO/IEC DIS 23090-10 Carriage of Video-based Point Cloud Compression Data", Systems, ISO/IEC JTC1/SC29/WG11, N19066, Feb. 21, 2020, pp. 1-46.

\* cited by examiner

APPARATUS, A METHOD AND A COMPUTER PROGRAM FOR VIDEO CODING AND DECODING

TECHNICAL FIELD

The present invention relates to an apparatus, a method and a computer program for video coding and decoding.

BACKGROUND

Box-structured and hierarchical file format concepts have been widely used for media storage and sharing. Available media file format standards include ISO base media file format (ISO/IEC 14496-12, which may be abbreviated ISOBMFF), and its various derivatives. ISOBMFF allows storage of timely captured audio/visual media streams, called media tracks. The metadata which describes the track is separated from the encoded bitstream itself. Upon playback, a file parser may then select a suitable track to be extracted and played back.

ISOBMFF contains a particular feature called "alternate tracks", which enables signaling any time-wise equivalent alternatives of a media. Thus, various mutually alternative media tracks may be grouped, and only one media track among the alternatives should be played back during the presentation time. The switching between alternative representations by a player upon rendering and playback is limited to alternative representations for the same volumetric object, such as tracks of various sub-bitstreams of video-based point cloud compression (V-PCC), wherein the switching may be carried out based on quality, bandwidth and resources required for playback.

However, there is no mechanism to have multiple volumetric objects encoded in the same file so that they could be switched between each other as an alternate representation during playback. This limits the possibilities of a content creator for providing the user of the playback device with versatile options for controlling the playback as desired.

SUMMARY

Now in order to at least alleviate the above problems, an enhanced method for indicating grouping of representations is introduced herein.

The scope of protection sought for various embodiments of the invention is set out by the independent claims. The embodiments and features, if any, described in this specification that do not fall under the scope of the independent claims are to be interpreted as examples useful for understanding various embodiments of the invention.

A method according to a first aspect comprises writing, in a container file, a first video-based point cloud compression (V-PCC) bitstream and a second V-PCC bitstream, wherein said first and second V-PCC bitstreams are associated with a common group based on at least one logical context; writing, in the container file, an indication about the common group between the first V-PCC bitstream and the second V-PCC bitstream; generating a media presentation description (MPD) file with a first representation belonging to a first adaptation set associated with the first V-PCC bitstream and a second representation belonging to a second adaptation set associated with the second V-PCC bitstream; and writing, in the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives upon rendering.

An apparatus according to a second aspect comprises at least one processor and at least one memory, said at least one memory stored with computer program code thereon, the at least one memory and the computer program code configured to, with the at least one processor, cause the apparatus at least to perform: write, in a container file, a first video-based point cloud compression (V-PCC) bitstream and a second V-PCC bitstream, wherein said first and second V-PCC bitstreams are associated with a common group based on at least one logical context; write, in the container file, an indication about the common group between the first V-PCC bitstream and the second V-PCC bitstream; generate a media presentation description (MPD) file with a first representation belonging to a first adaptation set associated with the first V-PCC bitstream and a second representation belonging to a second adaptation set associated with the second V-PCC bitstream; and write, in the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives upon rendering.

An apparatus according to a third aspect comprises: means for writing, in a container file, a first video-based point cloud compression (V-PCC) bitstream and a second V-PCC bitstream, wherein said first and second V-PCC bitstreams are associated with a common group based on at least one logical context; means for writing, in the container file, an indication about the common group between the first V-PCC bitstream and the second V-PCC bitstream; means for generating a media presentation description (MPD) file with a first representation belonging to a first adaptation set associated with the first V-PCC bitstream and a second representation belonging to a second adaptation set associated with the second V-PCC bitstream; and means for writing, in the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives upon rendering.

According to an embodiment, the apparatus further comprises means for encapsulating the first and the second V-PCC bitstream in a single-track or in a multi-track container.

According to an embodiment, said indication is configured to be carried in a syntax element defining an entity group.

According to an embodiment, said indication is configured to be carried in a syntax element defining used data.

According to an embodiment, said indication is configured to be carried in a syntax element defining a track group.

A method according to a fourth aspect comprises: receiving a bitstream comprising a media file including or inferring to a container file comprising a first video-based point cloud compression (V-PCC) bitstream and a second V-PCC bitstream, wherein said first and second V-PCC bitstreams are associated with a common group based on at least one logical context, and an indication about the common group between the first V-PCC bitstream and the second V-PCC bitstream; parsing, from a media presentation description (MPD) file, a first representation belonging to a first adaptation set associated with the first V-PCC bitstream and a second representation belonging to a second adaptation set associated with the second V-PCC bitstream; parsing, from the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives; and selecting either the first representation or the second representation for rendering.

An apparatus according to a fifth aspect comprises at least one processor and at least one memory, said at least one memory stored with computer program code thereon, the at least one memory and the computer program code configured to, with the at least one processor, cause the apparatus at least to perform: receive a bitstream comprising a media file including or inferring to a container file comprising a first video-based point cloud compression (V-PCC) bitstream and a second V-PCC bitstream, wherein said first and second V-PCC bitstreams are associated with a common group based on at least one logical context, and an indication about the common group between the first V-PCC bitstream and the second V-PCC bitstream; parse, from a media presentation description (MPD) file, a first representation belonging to a first adaptation set associated with the first V-PCC bitstream and a second representation belonging to a second adaptation set associated with the second V-PCC bitstream; parse, from the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives; and select either the first representation or the second representation for rendering.

An apparatus according to a sixth aspect comprises: means for receiving a bitstream comprising a media file including or inferring to a container file comprising a first video-based point cloud compression (V-PCC) bitstream and a second V-PCC bitstream, wherein said first and second V-PCC bitstreams are associated with a common group based on at least one logical context, and an indication about the common group between the first V-PCC bitstream and the second V-PCC bitstream; means for parsing, from a media presentation description (MPD) file, a first representation belonging to a first adaptation set associated with the first V-PCC bitstream and a second representation belonging to a second adaptation set associated with the second V-PCC bitstream; means for parsing, from the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives; and means for selecting either the first representation or the second representation for rendering.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
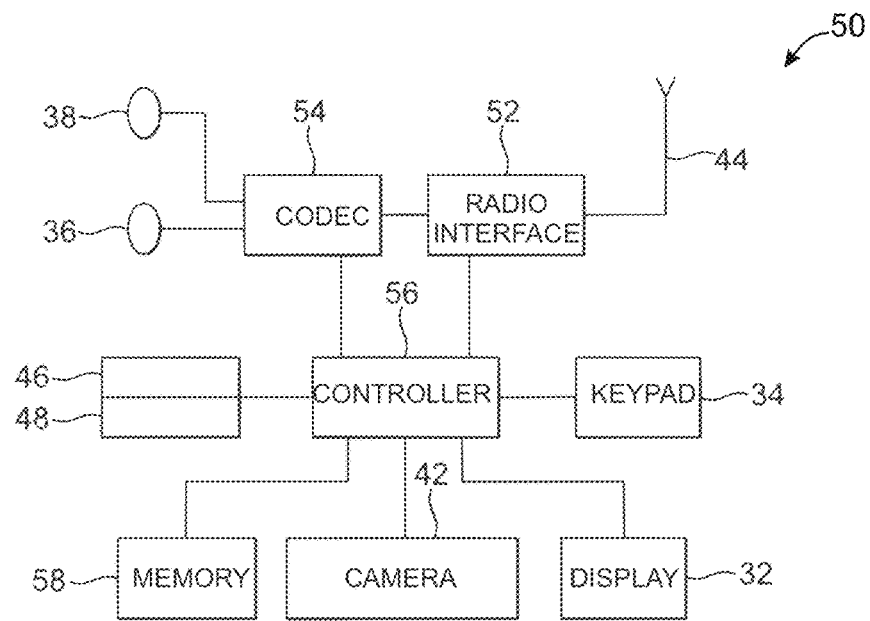
FIG. 1 shows schematically an electronic device employing embodiments of the invention.
Figure 2:
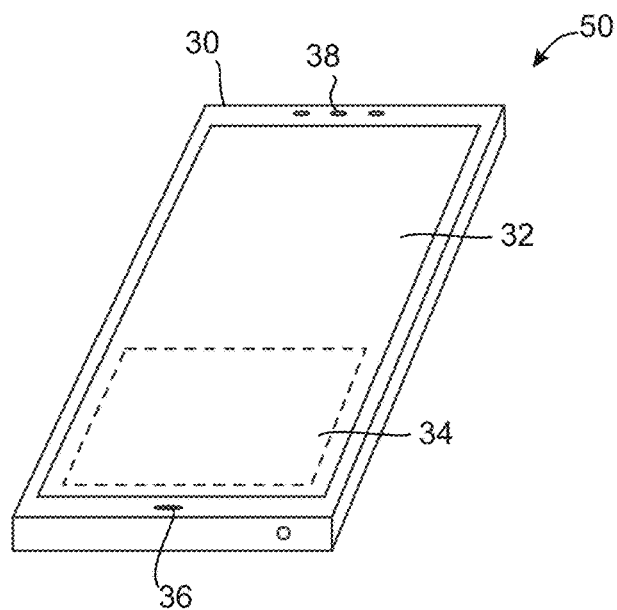
FIG. 2 shows schematically a user equipment suitable for employing embodiments of the invention.

The following describes in further detail suitable apparatus and possible mechanisms for indicating track grouping. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
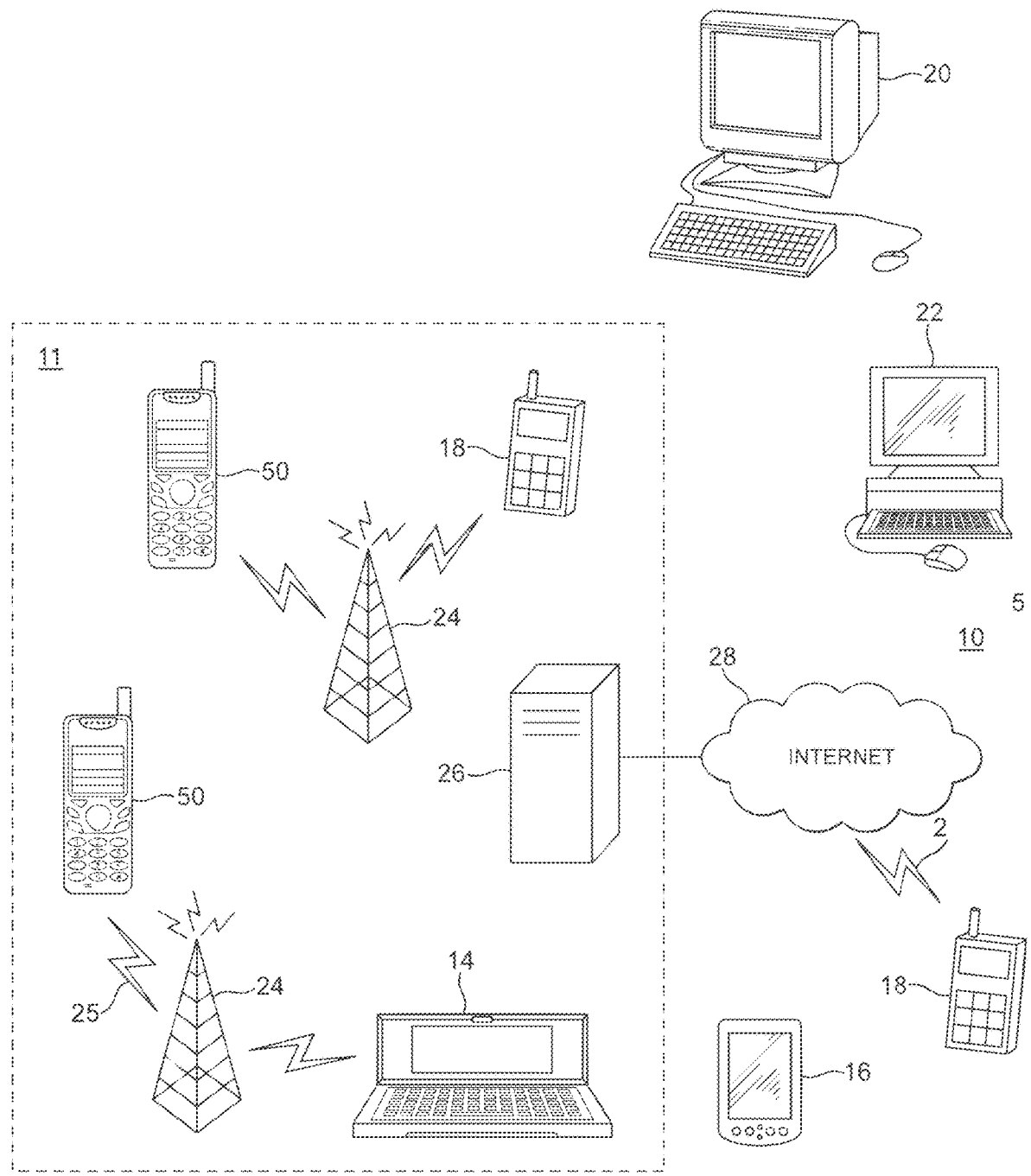
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Box-structured and hierarchical file format concepts have been widely used for media storage and sharing. Available media file format standards include ISO base media file format (ISO/IEC 14496-12, which may be abbreviated ISOBMFF), and its derivatives, such as MP4 and 3GPP file formats, e.g. the file format for NAL unit structured video (ISO/IEC 14496-15).

ISOBMFF allows storage of timely captured audio/visual media streams, called media tracks. The metadata which describes the track is separated from the encoded bitstream itself. The format provides mechanisms to access media data in a codec-agnostic fashion from file parser perspective.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes.

Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
        unsigned int(32) track_IDs[ ];
}
``` track_IDs may be specified as an array of integers providing the track identifiers of the referenced tracks or track_group_id values of the referenced track groups. Each value of track_IDs[i], where i is a valid index to the track_IDsH array, is an integer that provides a reference from the containing track to the track with track_ID equal to track_IDs[i] or to the track group with both track_group_id equal to track_IDs[i] and a particular bit (e.g. the least significant bit) of the flags field of TrackGroupTypeBox equal to 1. When a track_group_id value is referenced, the track reference applies to each track of the referenced track group individually unless stated otherwise in the semantics of particular track reference types. The value 0 might not be allowed to be present.

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. Track groups are not used to indicate dependency relationships between tracks. Instead, the TrackReferenceBox is used for such purposes.

The syntax of TrackGroupBox is the following:

```
aligned(8) class TrackGroupBox('trgr') {
}
aligned(8) class TrackGroupTypeBox(unsigned int(32)
track_group_type) extends FullBox(track_group_type, version = 0,
flags = 0)
{
    unsigned int(32) track_group_id;
    // the remaining data may be specified for a particular
track_group_type
}
```

Alternate Tracks

ISOBMFF contains a particular feature called "alternate tracks". This feature enables signaling any time-wise equivalent alternatives of a media. This is signaled using a particular "alternate_group" field in the track header box:

```
aligned(8) class TrackHeaderBox
    extends FullBox('tkhd', version, flags){
    if (version==1) {
        unsigned int(64) creation_time;
        unsigned int(64) modification_time;
        unsigned int(32) track_ID;
        const unsigned int(32)          reserved = 0;
        unsigned int(64) duration;
    } else { // version==0
        unsigned int(32) creation_time;
        unsigned int(32) modification_time;
        unsigned int(32) track_ID;
        const unsigned int(32)          reserved = 0;
        unsigned int(32) duration;
    }
    const unsigned int(32)[2]           reserved = 0;
    template int(16) layer = 0;
    template int(16) alternate_group = 0;
    template int(16) volume = {if track_is_audio 0x0100 else 0};
    const unsigned int (16)   reserved = 0;
    template int(32)[9]   matrix=
        { 0x00010000,0,0,0,0x00010000,0,0,0,0x40000000 };
        // unity matrix
unsigned int(32) width;
    unsigned int(32) height;
}
``` alternate_group is an integer that specifies a group or collection of tracks. If this field is 0 there is no information on possible relations to other tracks. If this field is not 0, it should be the same for tracks that contain alternate data for one another and different for tracks belonging to different such groups. Only one track within an alternate group should be played or streamed at any one time, and must be distinguishable from other tracks in the group via attributes such as bitrate, codec, language, packet size etc. A group may have only one member.

Typically, alternate grouping field indicates alternatives of a media track such as:
  Different languages of the same audio track
  Different resolution or bitrate options of the same media track
  Different view of the 2D scene which is time-wise aligned with the main 2D scene (i.e. different camera angle)

Only one media track among the alternatives should be played back during the presentation time. This restriction comes from the ISOBMFF specification and the alternate_group field definition. The playback behavior for playing back multiple such media tracks is undefined.

Media players typically read the alternate grouping information and create a tree-structured information which groups the tracks together and then select the first track (i.e. lowest indexed) in the alternative tracks for initial playback. Moreover, the user can also manually switch between the alternatives.

Entity Groups

An entity group is a grouping of items, which may also group tracks. An entity may be regarded as a common term for an item and a track, and a referenced entity can be resolved to either an item or a track. The entities in an entity group share a particular characteristic or have a particular relationship, as indicated by the grouping type.

Entity groups are indicated in GroupsListBox. Entity groups specified in GroupsListBox of a file-level MetaBox refer to tracks or file-level items. Entity groups specified in GroupsListBox of a movie-level MetaBox refer to movie-level items. Entity groups specified in GroupsListBox of a track-level MetaBox refer to track-level items of that track. When GroupsListBox is present in a file-level MetaBox, there is no item_ID value in ItemInfoBox in any file-level MetaBox that is equal to the track_ID value in any TrackHeaderBox.

GroupsListBox contains EntityToGroupBoxes, each specifying one entity group. The four-character box type of EntityToGroupBox denotes a defined grouping type.

The 'altr' entity grouping type has been specifies as follows: The items and tracks mapped to this grouping are alternatives to each other, and only one of them should be played (when the mapped items and tracks are part of the presentation; e.g. are displayable image items or tracks) or processed by other means (when the mapped items or tracks are not part of the presentation; e.g. are metadata). A player should select the first entity from the list of entity_id values that it can process (e.g. decode and play for mapped items and tracks that are part of the presentation) and that suits the application needs. Any entity_id value shall be mapped to only one grouping of type 'altr'. An alternate group of entities consists of those items and tracks that are mapped to the same entity group of type 'altr'.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a HandlerBox ('hdlr') box indicating the structure or format of the 'meta' box contents. The meta box may list and characterize any number of items that can be referred and each one of them can be associated with a file name and are uniquely identified with the filef by item identifier (item_id) which is an integer value. The metadata items may be for example stored in the Item Data Box ('idat') box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents. The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

Hypertext Transfer Protocol (HTTP) has been widely used for the delivery of real-time multimedia content over the Internet, such as in video streaming applications. Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats,"). MPEG DASH and 3GP-DASH are technically close to each other and may therefore be collectively referred to as DASH. Some concepts, formats and operations of DASH are described below as an example of a video streaming system, wherein the embodiments may be implemented. The aspects of the invention are not limited to the above standard documents but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request.

To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML. The MPD may be specified using the following conventions: Elements in an XML document may be identified by an upper-case first letter and may appear in bold face as Element. To express that an element Element1 is contained in another element Element2, one may write Element2.Element1. If an element's name consists of two or more combined words, camel-casing may be used, such as ImportantElement, for example. Elements may be present either exactly once, or the minimum and maximum occurrence may be defined by <minOccurs> . . . <maxOccurs>. Attributes in an XML document may be identified by a lower-case first letter as well as they may be preceded by a ' @'-sign, e.g. @attribute, for example. To point to a specific attribute @attribute contained in an element Element, one may write Element@attribute. If an attribute's name consists of two or more combined words, camel-casing may be used after the first word, such as @veryImportantAttribute, for example. Attributes may have assigned a status in the XML as mandatory (M), optional (O), optional with default value (OD) and conditionally mandatory (CM).

In DASH, all descriptor elements are typically structured in the same way, in that they contain a @schemeIdUri attribute that provides a URI to identify the scheme and an optional attribute @value and an optional attribute @id. The semantics of the element are specific to the scheme employed. The URI identifying the scheme may be a URN or a URL. Some descriptors are specified in MPEG-DASH (ISO/IEC 23009-1), while descriptors can additionally or alternatively be specified in other specifications. When specified in specifications other than MPEG-DASH, the MPD does not provide any specific information on how to use descriptor elements. It is up to the application or specification that employs DASH formats to instantiate the description elements with appropriate scheme information. Applications or specifications that use one of these elements define a Scheme Identifier in the form of a URI and the value space for the element when that Scheme Identifier is used. The Scheme Identifier appears in the @schemeIdUri attribute. In the case that a simple set of enumerated values are required, a text string may be defined for each value and this string may be included in the @value attribute. If structured data is required then any extension element or attribute may be defined in a separate namespace. The @id value may be used to refer to a unique descriptor or to a group of descriptors. In the latter case, descriptors with identical values for the attribute @id may be required to be synonymous, i.e. the processing of one of the descriptors with an identical value for @id is sufficient. Two elements of type DescriptorType are equivalent, if the element name, the value of the @schemeIdUri and the value of the @value attribute are equivalent. If the @schemeIdUri is a URN, then equivalence may refer to lexical equivalence as defined in clause 5 of RFC 2141. If the @schemeIdUri is a URL, then equivalence may refer to equality on a character-for-character basis as defined in clause 6.2.1 of RFC3986. If the @value attribute is not present, equivalence may be determined by the equivalence for @schemeIdUri only. Attributes and element in extension namespaces might not be used for determining equivalence. The @id attribute may be ignored for equivalence determination.

MPEG-DASH specifies descriptors EssentialProperty and SupplementalProperty. For the element EssentialProperty the Media Presentation author expresses that the successful processing of the descriptor is essential to properly use the information in the parent element that contains this descriptor unless the element shares the same @id with another EssentialProperty element. If EssentialProperty elements share the same @id, then processing one of the EssentialProperty elements with the same value for @id is sufficient. At least one EssentialProperty element of each distinct @id value is expected to be processed. If the scheme or the value for an EssentialProperty descriptor is not recognized the DASH client is expected to ignore the parent element that contains the descriptor. Multiple EssentialProperty elements with the same value for @id and with different values for @id may be present in an MPD.

For the element SupplementalProperty the Media Presentation author expresses that the descriptor contains supplemental information that may be used by the DASH client for optimized processing. If the scheme or the value for a SupplementalProperty descriptor is not recognized the DASH client is expected to ignore the descriptor. Multiple SupplementalProperty elements may be present in an MPD.

MPEG-DASH specifies a Viewpoint element that is formatted as a property descriptor. The @schemeIdUri attribute of the Viewpoint element is used to identify the viewpoint scheme employed. Adaptation Sets containing non-equivalent Viewpoint element values contain different media content components. The Viewpoint elements may equally be applied to media content types that are not video. Adaptation Sets with equivalent Viewpoint element values are intended to be presented together. This handling should be applied equally for recognized and unrecognized @schemeIdUri values.

SRD (Spatial Relationship Description) is specified in the normative Annex H of MPEG-DASH. The following contains some excerpts of the SRD specification.

The SRD scheme allows Media Presentation Description authors to express spatial relationships between Spatial Objects. A Spatial Object is represented by either an Adaptation Set or a Sub-Representation. As an example, a spatial relationship may express that a video represents a spatial part of another full-frame video (e.g. a region of interest, or a tile).

The SupplementalProperty and/or EssentialProperty descriptors with @schemeIdUri equal to "urn:mpeg:dash:srd:2014" are used to provide spatial relationship information associated to the containing Spatial Object. SRD shall be contained exclusively in these two MPD elements (AdaptationSet and SubRepresentation).

Sub-Representation level SRDs may be used to represent Spatial Objects in one Representation such as HEVC tiling streams. In that case, SRD descriptors may be present at Adaptation Set as well as Sub-Representation levels.

The @value of the SupplementalProperty or EssentialProperty elements using the SRD scheme is a comma separated list of values for SRD parameters. The SRD parameters source_id, object_x, object_y, object_width, and object_height are required to be present and the SRD parameters total_width, total_height, and spatial_set_id are conditionally or optionally present.

source_id is a non-negative integer in decimal representation providing the identifier for the source of the content. The source_id parameter provides a unique identifier, within the Period, for the source of the content. It implicitly defines a coordinate system associated to this source. This coordinate system uses an arbitrary origin (0; 0); the x-axis is oriented from left to right and the y-axis from top to bottom. All SRD sharing the same source_id value have the same origin and axes orientations. Spatial relationships for Spatial Objects using SRD with different source_id values are undefined.

For a given source_id value, a reference space is defined, corresponding to the rectangular region encompassing the entire source content, whose top-left corner is at the origin of the coordinate system. The total_width and total_height values in a SRD provide the size of this reference space expressed in arbitrary units. total_width is a non-negative integer in decimal representation expressing the width of the reference space in arbitrary units. total_height is a non-negative integer in decimal representation expressing the height of the reference space in arbitrary units. It is allowed that there is no Spatial Object in the MPD that covers the entire source of the content, e.g. when the entire source content is represented by two separate videos.

object_x is a non-negative integer in decimal representation expressing the horizontal position of the top-left corner of the Spatial Object in arbitrary units. object_y is a non-negative integer in decimal representation expressing the vertical position of the top-left corner of the Spatial Object in arbitrary units. object_width is a non-negative integer in decimal representation expressing the width of the Spatial Object in arbitrary units. object_height is a non-negative integer in decimal representation expressing the height of the Spatial Object in arbitrary units. The object_x and object_y parameters (respectively object_width and object_height) express 2D positions (respectively 2D sizes) of the associated Spatial Object in the coordinate system associated to the source. The values of the object_x, object_y, object_width, and object_height parameters are relative to the values of the total_width and total_height parameters, as defined above. Positions (object_x, object_y) and sizes (object_width, object_height) of SRDs sharing the same source_id value may be compared after taking into account the size of the reference space, i.e. after the object_x and object_width values are divided by the total_width value and the object_y and object_height values divided by the total_height value of their respective descriptors. Different total_width and total_height values may be used in different descriptors to provide positions and sizes information in different units for the same reference space.

spatial_set_id is a non-negative integer in decimal representation providing an identifier for a group of Spatial Objects. When not present, the Spatial Object associated to this descriptor does not belong to any spatial set and no spatial set information is given. MPD authors can express, using the spatial_set_id parameter, that some Spatial Objects, within a given source_id, have a particular spatial relationship. For instance, an MPD author may group all Adaptation Sets corresponding to tiles at a same resolution level. This way, the spatial_set_id parameter may be used by the DASH client to quickly select spatially related Spatial Objects.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments to enable downloading segments in multiple parts, for example. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If a relatively long Segment duration is used, then Subsegments may be used to keep the size of HTTP responses reasonable and flexible for bitrate adaptation. The indexing information of a segment may be put in the single box at the beginning of that segment or spread among many indexing boxes in the segment. Different methods of spreading are possible, such as hierarchical, daisy chain, and hybrid, for example. This technique may avoid adding a large box at the beginning of the segment and therefore may prevent a possible initial download delay.

Sub-Representations are embedded in regular Representations and are described by the SubRepresentation element. SubRepresentation elements are contained in a Representation element. The SubRepresentation element describes properties of one or several media content components that are embedded in the Representation. It may for example describe the exact properties of an embedded audio component (such as codec, sampling rate, etc., for example), an embedded sub-title (such as codec, for example) or it may describe some embedded lower quality video layer (such as some lower frame rate, or otherwise, for example). Sub-Representations and Representation share some common attributes and elements. In case the @level attribute is present in the SubRepresentation element, the following applies:

Sub-Representations provide the ability for accessing a lower quality version of the Representation in which they are contained. In this case, Sub-Representations for example allow extracting the audio track in a multiplexed Representation or may allow for efficient fast-forward or rewind operations if provided with lower frame rate;

The Initialization Segment and/or the Media Segments and/or the Index Segments shall provide sufficient information such that the data can be easily accessed through HTTP partial GET requests. The details on providing such information are defined by the media format in use.

When ISOBMFF Segments are used, the following applies:
The Initialization Segment contains the Level Assignment box.
The Subsegment Index box ('ssix') is present for each Subsegment.
The attribute @level specifies the level to which the described Sub-Representation is associated to in the Subsegment Index. The information in Representation, Sub-Representation and in the Level Assignment ('leva') box contains information on the assignment of media data to levels.
Media data should have an order such that each level provides an enhancement compared to the lower levels.
If the @level attribute is absent, then the SubRepresentation element is solely used to provide a more detailed description for media streams that are embedded in the Representation.

The ISOBMFF includes the so-called level mechanism to specify subsets of the file. Levels follow the dependency hierarchy so that samples mapped to level n may depend on any samples of levels m, where m<=n, and do not depend on any samples of levels p, where p>n. For example, levels can be specified according to temporal sub-layer (e.g., TemporalId of HEVC). Levels may be announced in the Level Assignment ('leva') box contained in the Movie Extends ('mvex') box. Levels cannot be specified for the initial movie. When the Level Assignment box is present, it applies to all movie fragments subsequent to the initial movie. For the context of the Level Assignment box, a fraction is defined to consist of one or more Movie Fragment boxes and the associated Media Data boxes, possibly including only an initial part of the last Media Data Box. Within a fraction, data for each level appears contiguously. Data for levels within a fraction appears in increasing order of level value. All data in a fraction is assigned to levels. The Level Assignment box provides a mapping from features, such as scalability layers or temporal sub-layers, to levels. A feature can be specified through a track, a sub-track within a track, or a sample grouping of a track. For example, the Temporal Level sample grouping may be used to indicate a mapping of the pictures to temporal levels, which are equivalent to temporal sub-layers in HEVC. That is, HEVC pictures of a certain TemporalId value may be mapped to a particular temporal level using the Temporal Level sample grouping (and the same can be repeated for all TemporalId values). The Level Assignment box can then refer to the Temporal Level sample grouping in the indicated mapping to levels.

The Subsegment Index box ('ssix') provides a mapping from levels (as specified by the Level Assignment box) to byte ranges of the indexed subsegment. In other words, this box provides a compact index for how the data in a subsegment is ordered according to levels into partial subsegments. It enables a client to easily access data for partial subsegments by downloading ranges of data in the subsegment. When the Subsegment Index box is present, each byte in the subsegment is assigned to a level. If the range is not associated with any information in the level assignment, then any level that is not included in the level assignment may be used. There is 0 or 1 Subsegment Index boxes present per each Segment Index box that indexes only leaf subsegments, i.e. that only indexes subsegments but no segment indexes. A Subsegment Index box, if any, is the next box after the associated Segment Index box. A Subsegment Index box documents the subsegment that is indicated in the immediately preceding Segment Index box. Each level may be assigned to exactly one partial subsegment, i.e. byte ranges for one level are contiguous. Levels of partial subsegments are assigned by increasing numbers within a subsegment, i.e., samples of a partial subsegment may depend on any samples of preceding partial subsegments in the same subsegment, but not the other way around. For example, each partial subsegment contains samples having an identical temporal sub-layer and partial subsegments appear in increasing temporal sub-layer order within the subsegment. When a partial subsegment is accessed in this way, the final Media Data box may be incomplete, that is, less data is accessed than the length indication of the Media Data Box indicates is present. The length of the Media Data box may need adjusting, or padding may be used. The padding_flag in the Level Assignment Box indicates whether this missing data can be replaced by zeros. If not, the sample data for samples assigned to levels that are not accessed is not present, and care should be taken.

MPEG-DASH defines segment-container formats for both ISOBMFF and MPEG-2 Transport Streams. Other specifications may specify segment formats based on other container formats. For example, a segment format based on Matroska container file format has been proposed and may be summarized as follows. When Matroska files are carried as DASH segments or alike, the association of DASH units and Matroska units may be specified as follows. A subsegment (of DASH) may be are defined as one or more consecutive Clusters of Matroska-encapsulated content. An Initialization Segment of DASH may be required to comprise the EBML header, Segment header (of Matroska), Segment Information (of Matroska) and Tracks, and may optionally comprise other level1 elements and padding. A Segment Index of DASH may comprise a Cues Element of Matroska.

The Role descriptor is specified in the MPEG DASH specification (ISO/IEC 23009-1). The URN "urn:mpeg:dash:role:2011" is defined in ISO/IEC 23009-1 to identify the role scheme defined in Table below. Note that Role@value shall be assigned to Adaptation Sets that contain a media component type to which this role is associated.

TABLE 1

Role@value attribute for scheme with a value "urn:mpeg:dash:role:2011"

| Role@value | Description |
| --- | --- |
| caption | captions (see note 3 below) |
| subtitle | subtitles (see note 3 below) |
| main | main media component(s) which is/are intended for presentation if no other information is provided |
| alternate | media content component(s) that is/are an alternative to (a) main media content component(s) of the same media component type (see note 2 below) |
| supplementary | media content component that is supplementary to a media content component of a different media component type (see Note 1 below) |
| commentary | experience that contains a commentary (e.g. director's commentary) (typically audio) |
| dub | experience that contains an element that is presented in a different language from the original (e.g. dubbed audio, translated captions) |
| description | Textual or audio media component containing a textual description (intended for audio synthesis) or an audio description describing a visual component |
| sign | Visual media component representing a sign-language interpretation of an audio component. |
| metadata | Media component containing information intended to be processed by application specific elements. |

TABLE 1-continued

Role@value attribute for scheme with a value "urn:mpeg:dash:role:2011"

| Role@value | Description |
| --- | --- |
| enhanced-audio-intelligibility | experience containing an element for improved intelligibility of the dialogue |
| emergency | experience that provides information, about a current emergency, that is intended to enable the protection of life, health, safety, and property, and may also include critical details regarding the emergency and how to respond to the emergency |

NOTES
1) A normal audio/video program labels both the primary audio and video as "main". However, when the two media component types are not equally important, for example (a) video providing a pleasant visual experience to accompany a music track that is the primary content or (b) ambient audio accompanying a video showing a live scene such as a sports event, that is the primary content, the accompanying media may be assigned a "supplementary" role.
2) alternate media content components should carry other descriptors to indicate in what way it differs from the main media content components (e.g. a Viewpoint descriptor or a Role descriptor), especially when multiple alternate media content components including multiple supplementary media content components are available.
3) open ("burned in") captions or subtitles would be marked as media type component "video" only, but having a descriptor saying "caption" or "subtitle";
4) Role descriptors with values such as "subtitle", "caption", "description", "sign" or "metadata" may be used to enable assignment of a "kind" value in HTML 5 applications for tracks exposed from a DASH MPD.

Subsets

Subsets are described by the Subset element contained in the Period element.

Subsets provide a mechanism to restrict the combination of active Adaptation Sets where an active Adaptation Set is one for which the DASH client is presenting at least one of the contained Representations.

A Subset defines a set of one or more Adaptation Sets. The presence of a Subset element within a Period element expresses the intention of the creator of the Media Presentation that a client should act as follows: At any time, the set of active Adaptation Sets shall be a subset of the Adaptation Sets of one of the specified Subsets. Any Adaptation Set not explicitly contained in any Subset element is implicitly contained in all specified Subsets.

This implies that

Empty Subsets are not allowed.

No Subset should contain all the Adaptation Sets.

Each Adaptation Set for which the value of the @id is provided in the @contains attribute is contained in this Subset.

The semantics of the attributes and elements within a Subset are provided in Table below.

TABLE 2

Subset element semantics

| Element or Attribute Name | Use | Description |
| --- | --- | --- |
| Subset | | specifies a Subset |
| @contains | M | specifies the Adaptation Sets contained in a Subset by providing a white-space separated list of the @id values of the contained Adaptation Sets. |
| @id | O | specifies a unique identifier for the Subset. |

Legend:
For attributes:
M = Mandatory,
O = Optional,
OD = Optional with Default Value,
CM = Conditionally Mandatory.
For elements: <minOccurs> ... <maxOccurs> (N = unbounded)
Elements are bold; attributes are non-bold and preceded with an @.

Volumetric video may be captured using one or more three-dimensional (3D) cameras. When multiple cameras are in use, the captured footage is synchronized so that the cameras provide different viewpoints to the same world. In contrast to traditional 2D/3D video, volumetric video describes a 3D model of the world where the viewer is free to move and observer different parts of the world.

Volumetric video enables the viewer to move in six degrees of freedom (6DOF): in contrast to common 360° video, where the user has from 2 to 3 degrees of freedom (yaw, pitch, and possibly roll), a volumetric video represents a 3D volume of space rather than a flat image plane. Volumetric video frames contain a large amount of data because they model the contents of a 3D volume instead of just a two-dimensional (2D) plane. However, only a relatively small part of the volume changes over time. Therefore, it may be possible to reduce the total amount of data by only coding information about an initial state and changes which may occur between frames. Volumetric video can be rendered from synthetic 3D animations, reconstructed from multi-view video using 3D reconstruction techniques such as structure from motion, or captured with a combination of cameras and depth sensors such as LiDAR (Light Detection and Ranging), for example.

Volumetric video data represents a three-dimensional scene or object, and thus such data can be viewed from any viewpoint. Volumetric video data can be used as an input for augmented reality (AR), virtual reality (VR) and mixed reality (MR) applications. Such data describes geometry (shape, size, position in 3D-space) and respective attributes (e.g. color, opacity, reflectance, . . . ), together with any possible temporal changes of the geometry and attributes at given time instances (e.g. frames in 2D video). Volumetric video is either generated from 3D models, i.e. computer-generated imagery (CGI), or captured from real-world scenes using a variety of capture solutions, e.g. a multi-camera, a laser scan, a combination of video and dedicated depths sensors, etc. Also, a combination of CGI and real-world data is possible. Examples of representation formats for such volumetric data are triangle meshes, point clouds, or voxel. Temporal information about the scene can be included in the form of individual capture instances, i.e. "frames" in 2D video, or other means, e.g. position of an object as a function of time.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications, such as capturing real world 3D scenes where the topology is not necessarily a 2D manifold. Another way to represent 3D data is coding this 3D data as a set of texture and depth map as is the case in the multi-view plus depth. Closely related to the techniques used in multi-view plus depth is the use of elevation maps, and multi-level surface maps.

In 3D point clouds, each point of each 3D surface is described as a 3D point with color and/or other attribute information such as surface normal or material reflectance. Point cloud is a set of data points in a coordinate system, for example in a three-dimensional coordinate system being defined by X, Y, and Z coordinates. The points may represent an external surface of an object in the screen space, e.g. in a three-dimensional space.

In dense point clouds or voxel arrays, the reconstructed 3D scene may contain tens or even hundreds of millions of points. If such representations are to be stored or inter-changed between entities, then efficient compression of the presentations becomes fundamental. Standard volumetric video representation formats, such as point clouds, meshes, voxel, suffer from poor temporal compression performance. Identifying correspondences for motion-compensation in 3D-space is an ill-defined problem, as both, geometry and respective attributes may change. For example, temporal successive "frames" do not necessarily have the same number of meshes, points or voxel. Therefore, compression of dynamic 3D scenes is inefficient. 2D-video based approaches for compressing volumetric data, i.e. multiview with depth, have much better compression efficiency, but rarely cover the full scene. Therefore, they provide only limited 6DOF capabilities.

Instead of the above-mentioned approach, a 3D scene, represented as meshes, points, and/or voxel, can be projected onto one, or more, geometries. These geometries may be "unfolded" or packed onto 2D planes (two planes per geometry: one for texture, one for depth), which are then encoded using standard 2D video compression technologies. Relevant projection geometry information may be transmitted alongside the encoded video files to the decoder. The decoder decodes the video and performs the inverse projection to regenerate the 3D scene in any desired representation format (not necessarily the starting format).

Projecting volumetric models onto 2D planes allows for using standard 2D video coding tools with highly efficient temporal compression. Thus, coding efficiency can be increased greatly. Using geometry-projections instead of 2D-video based approaches based on multiview and depth, provides a better coverage of the scene (or object). Thus, 6DOF capabilities are improved. Using several geometries for individual objects improves the coverage of the scene further. Furthermore, standard video encoding hardware can be utilized for real-time compression/decompression of the projected planes. The projection and the reverse projection steps are of low complexity.

Examples of volumetric video data compressions standards are Video-based Point Cloud Compression (ISO/IEC 23090-5) and Multiview Immersive Video (ISO/IEC 23090-12). 3VC is the new name for the common core part between ISO/IEC 23090-5 (formerly V-PCC) and ISO/IEC 23090-12 (formerly MIV). 3VC will not be issued as a separate document, but as part of ISO/IEC 23090-5 (expected to include clauses 1-8 of the current V-PCC text). ISO/IEC 23090-12 will refer to this common part. ISO/IEC 23090-5 will be renamed to 3VC PCC, ISO/IEC 23090-12 renamed to 3VC MIV.

A 3VC (V-PCC/MIV) bitstream, containing coded point cloud sequence (CPCS), is composed of VPCC units carrying V-PCC parameter set (VPS) data, an atlas information bitstream, and 2D video encoded bitstreams (e.g. occupancy map bitstream, geometry bitstream, and zero or more attribute bitstreams). A 3VC (V-PCC/MIV) bitstream can be stored in ISOBMFF container according to ISO/IEC 23090-10. Two modes are supported: single-track container and multi-track container.

Single-track container is utilized in the case of simple ISOBMFF encapsulation of a V-PCC encoded bitstream. In this case, a V-PCC bitstream is directly stored as a single track without further processing. Single-track should use sample entry type of 'vpe1' or 'vpeg'.

Under the 'vpe1' sample entry, all atlas parameter sets (as defined in ISO/IEC 23090-5) are stored in the setupUnit of sample entry. Under the 'vpeg' sample entry, the atlas parameter sets may be present in setupUnit array of sample entry, or in the elementary stream.

Multi-track container maps V-PCC units of a 3VC (V-PCC/MIV) elementary stream to individual tracks within the container file based on their types. There are two types of tracks in a multi-track container: V-PCC track and V-PCC component track. The V-PCC track is a track carrying the volumetric visual information in the V-PCC bitstream, which includes the atlas sub-bitstream and the atlas sequence parameter sets. V-PCC component tracks are restricted video scheme tracks which carry 2D video encoded data for the occupancy map, geometry, and attribute sub-bitstreams of the 3VC (V-PCC/MIV) bitstream. Multi-track should use for V-PCC track sample entry type of 'vpcl' or 'vpcg'.

Under the 'vpcl' sample entry, all atlas parameter sets (as defined in ISO/IEC 23090-5) shall be in the setupUnit array of sample entry. Under the 'vpcg' sample entry, the atlas parameter sets may be present in this array, or in the stream.

The 2D video standards include, for example, H.264/AVC standard, which was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

A video codec comprises an encoder that transforms the input video into a compressed representation suited for storage/transmission, and a decoder that can decompress the compressed video representation back into a viewable form. An encoder may discard some information in the original video sequence in order to represent the video in a more compact form (i.e. at lower bitrate).

Figure 4A:
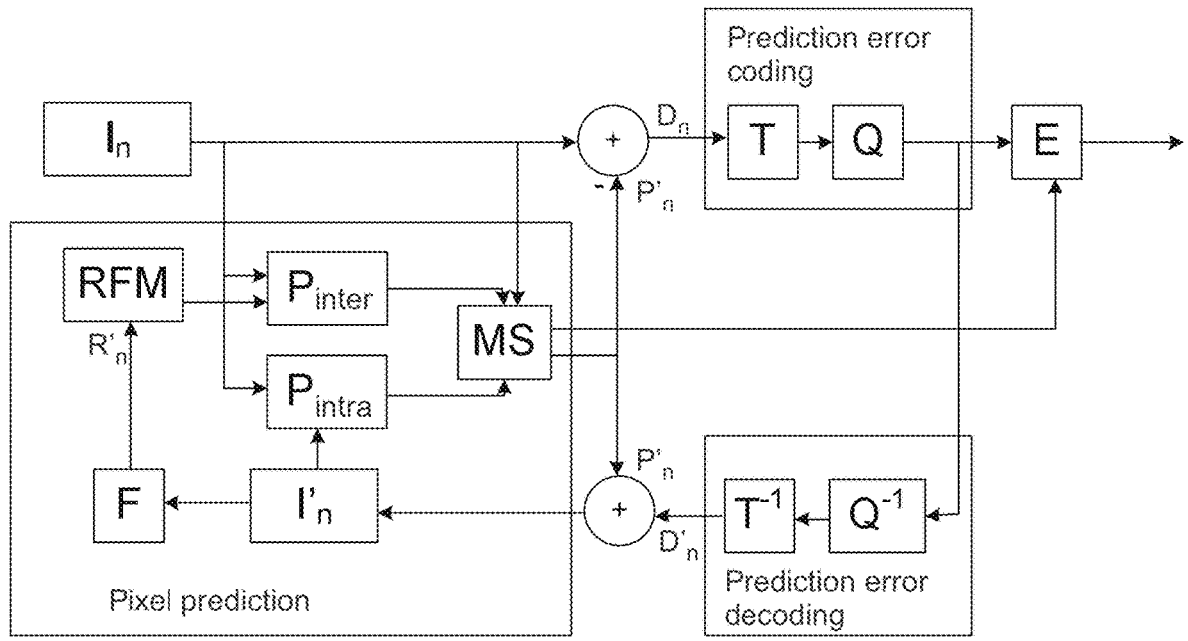
FIGS. 4a and 4b show schematically an encoder and a decoder suitable for implementing embodiments of the invention.
Figure 4B:
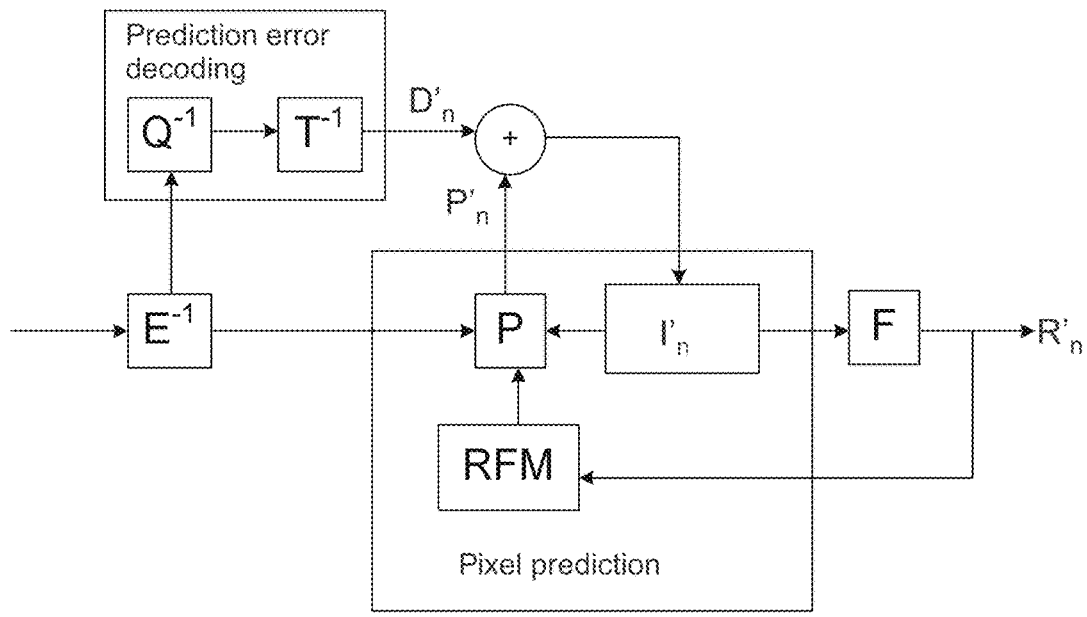

FIGS. 4a and 4b show an encoder and decoder for encoding and decoding the 2D texture pictures, geometry pictures and/or auxiliary pictures. A video codec consists of an encoder that transforms an input video into a compressed representation suited for storage/transmission and a decoder that can decompress the compressed video representation back into a viewable form. Typically, the encoder discards and/or loses some information in the original video sequence in order to represent the video in a more compact form (that is, at lower bitrate). An example of an encoding process is illustrated in FIG. 4a. FIG. 4a illustrates an image to be encoded ($I_n$); a predicted representation of an image block ($P'_n$); a prediction error signal ($D_n$); a reconstructed prediction error signal ($D'_n$); a preliminary reconstructed image ($I'_n$); a final reconstructed image ($R'_n$); a transform (T) and inverse transform ($T^{-1}$); a quantization (Q) and inverse quantization ($Q^{-1}$); entropy encoding (E); a reference frame memory (RFM); inter prediction ($P_{inter}$); intra prediction ($P_{intra}$); mode selection (MS) and filtering (F).

An example of a decoding process is illustrated in FIG. 4b. FIG. 4b illustrates a predicted representation of an image block ($P'_n$); a reconstructed prediction error signal ($D'_n$); a preliminary reconstructed image ($I'_n$); a final reconstructed image ($12^{n1}$); an inverse transform ($T^{-1}$); an inverse quantization ($Q^{-1}$); an entropy decoding ($E^{-1}$); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Many video encoders partition a picture into blocks along a block grid. For example, in the High Efficiency Video Coding (HEVC) standard, the following partitioning and definitions are used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

A first texture picture may be encoded into a bitstream, and the first texture picture may comprise a first projection of texture data of a first source volume of a scene model onto a first projection surface. The scene model may comprise a number of further source volumes.

In the projection, data on the position of the originating geometry primitive may also be determined, and based on this determination, a geometry picture may be formed. This may happen for example so that depth data is determined for each or some of the texture pixels of the texture picture. Depth data is formed such that the distance from the originating geometry primitive such as a point to the projection surface is determined for the pixels. Such depth data may be represented as a depth picture, and similarly to the texture picture, such geometry picture (such as a depth picture) may be encoded and decoded with a video codec. This first geometry picture may be seen to represent a mapping of the first projection surface to the first source volume, and the decoder may use this information to determine the location of geometry primitives in the model to be reconstructed. In order to determine the position of the first source volume and/or the first projection surface and/or the first projection in the scene model, there may be first geometry information encoded into or along the bitstream.

An attribute picture may be defined as a picture that comprises additional information related to an associated texture picture. An attribute picture may for example comprise surface normal, opacity, or reflectance information for a texture picture. A geometry picture may be regarded as one type of an attribute picture, although a geometry picture may be treated as its own picture type, separate from an attribute picture.

Texture picture(s) and the respective geometry picture(s), if any, and the respective attribute picture(s) may have the same or different chroma format.

Terms texture image and texture picture may be used interchangeably. Terms geometry image and geometry picture may be used interchangeably. A specific type of a geometry image is a depth image. Embodiments described in relation to a geometry image equally apply to a depth image, and embodiments described in relation to a depth image equally apply to a geometry image. Terms attribute image and attribute picture may be used interchangeably. A geometry picture and/or an attribute picture may be treated as an auxiliary picture in video/image encoding and/or decoding.

Figure 5A:
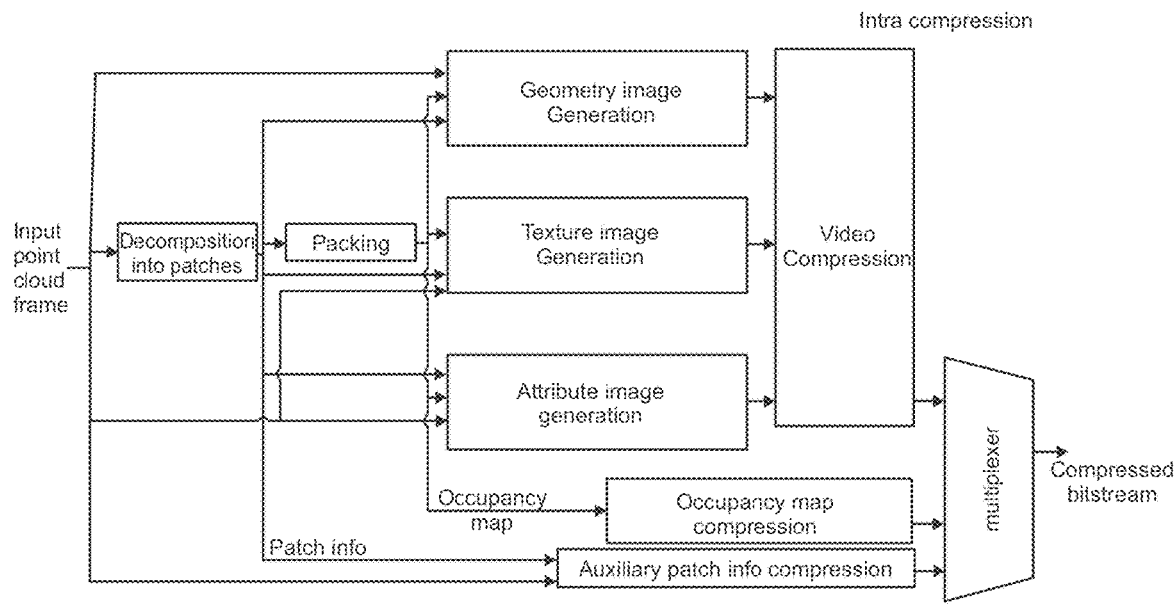
FIGS. 5a and 5b illustrate an overview of exemplified compression/decompression processes.
Figure 5B:
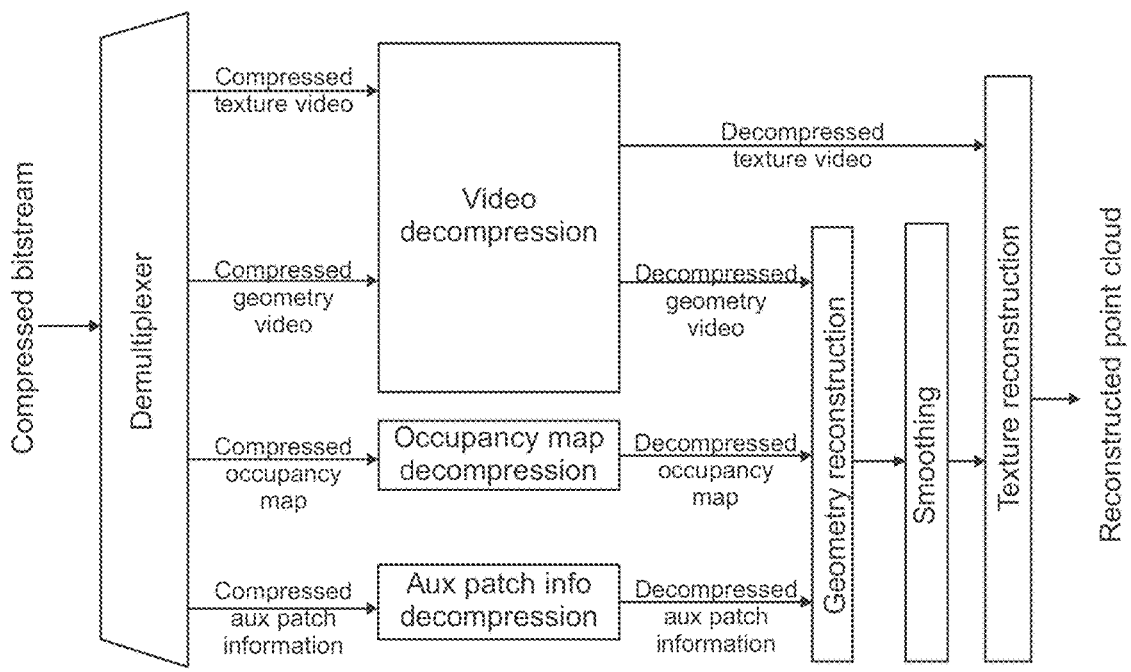

FIGS. 5a and 5b illustrate an overview of exemplified compression/decompression processes. The processes may be applied, for example, in Point Cloud Coding (PCC) according to MPEG standard. MPEG Video-Based Point Cloud Coding (V-PCC), Test Model a.k.a. TMC2v0 (MPEG N18017) discloses a projection-based approach for dynamic point cloud compression. For the sake of illustration, some of the processes related to video-based point cloud compression (V-PCC) compression/decompression are described briefly herein. For a comprehensive description of the model, a reference is made to MPEG N18017.

Each point cloud frame represents a dataset of points within a 3D volumetric space that has unique coordinates and attributes. The patch generation process decomposes the point cloud frame by converting 3D samples to 2D samples on a given projection plane using a strategy that provides the best compression. The patch generation process aims at decomposing the point cloud into a minimum number of patches with smooth boundaries, while also minimizing the reconstruction error.

The packing process aims at mapping the extracted patches onto a 2D grid while trying to minimize the unused space, and guaranteeing that every T×T (e.g., 16×16) block of the grid is associated with a unique patch. Herein, T is a user-defined parameter that is encoded in the bitstream and sent to the decoder.

The image generation process exploits the 3D to 2D mapping computed during the packing process to store the geometry and texture of the point cloud as images. In order to better handle the case of multiple points being projected to the same pixel, each patch is projected onto two images, referred to as layers. The generated videos may have the following characteristics: geometry: W×H YUV420-8 bit, where the geometry video is monochromatic, and texture: W×H YUV420-8 bit, where the texture generation procedure exploits the reconstructed/smoothed geometry in order to compute the colors to be associated with the re-sampled points. A padding process may be applied for filling the empty space between patches in order to generate a piecewise smooth image suited for video compression. The generated images/layers are stored as video frames and compressed using a video codec.

In the auxiliary patch information compression, a plurality of metadata is encoded/decoded for every patch, including e.g. an index of the projection plane, 2D bounding box and 3D location of the patch represented in terms of depth, tangential shift and bi-tangential shift. Also, mapping information providing for each T×T block with its associated patch index is encoded. The compressed auxiliary patch may also be referred to as an attribute image.

The occupancy map consists of a binary map that indicates for each cell of the grid whether it belongs to the empty space or to the point cloud. Herein, one cell of the 2D grid produces a pixel during the image generation process. When considering an occupancy map as an image, it may be considered to comprise occupancy patches. Occupancy patches may be considered to have block-aligned edges according to the auxiliary information described in the previous section. An occupancy patch hence comprises occupancy information for a corresponding texture and geometry patches. The occupancy map compression leverages the auxiliary information in order to detect the empty T×T blocks (i.e., blocks with patch index 0).

The point cloud geometry reconstruction process exploits the occupancy map information in order to detect the non-empty pixels in the geometry/texture images/layers. The 3D positions of the points associated with those pixels are computed by levering the auxiliary patch information and the geometry images.

The smoothing procedure aims at alleviating potential discontinuities that may arise at the patch boundaries due to compression artifacts. The implemented approach moves boundary points to the centroid of their nearest neighbors.

In the texture reconstruction process, the texture values are directly read from the texture images.

Thus, a V-PCC encoder generates, in addition to texture image bitstream, two or more video streams (occupancy map, geometry and zero or more attributes). A geometry image is generated based on input point cloud, occupancy map and decoded occupancy map information. An attribute image is generated based on input point cloud, reconstructed occupancy map and geometry information, and smoothed geometry information. Each of the occupancy map, geometry, and attribute bitstreams can be stored as separate tracks.

A content creator may decide to generate a number of versions of occupancy map, geometry and attributes video streams that target various devices (e.g. different processing power, different display capability) and network conditions. The different versions of occupancy map, geometry, and attribute video streams may be stored in separate tracks and grouped together using alternate_group mechanism of TrackHeaderBox, as described above, or EntityToGroupBox with grouping_type equal to 'altr', as defined in ISOBMFF.

Those mechanisms ensure that only one track within an alternate group is played or streamed at any one time, i.e. only one occupancy map track, one geometry track and one track per attribute will be played at one time.

However, the switching between (alternative) representations by a player upon rendering and playback is limited to alternative representations for the same volumetric object, wherein the switching may be carried out based on quality, bandwidth and resources required for playback. The problem may be illustrated by an exemplified use case, where Alice is getting married and wishes to buy a wedding dress from a wedding dress store owned by her friend Emma. Emma sends a catalogue of wedding dresses to Alice e.g. via an MMS. Alice downloads the catalogue and selects a dress A for viewing. Selecting dress A starts the streaming of volumetric object (e.g. point cloud encoded according to V-PCC specification) representation of the dress A.

Alice can select from three different representation of dress A.

First representation is Model ZZ walking, wearing dress A

Second representation is Model YY walking, wearing dress A

Third representation is Model ZZ walking, wearing a variation of dress A

The three representations form a part of the same logical group in the current context, even if they include different volumetric objects. However, the switching between alternate representations is limited to carried out for the same volumetric object. Currently, there is no mechanism in the ISOBMFF specification which allows to have multiple volumetric objects (e.g. point cloud encoded according to V-PCC specification) in the same file that could be logically grouped based on certain context and that could be switched between each other as an alternate representation.

Now an improved method for indicating grouping of representations is introduced in order to at least alleviate the above problems.

Figure 6:
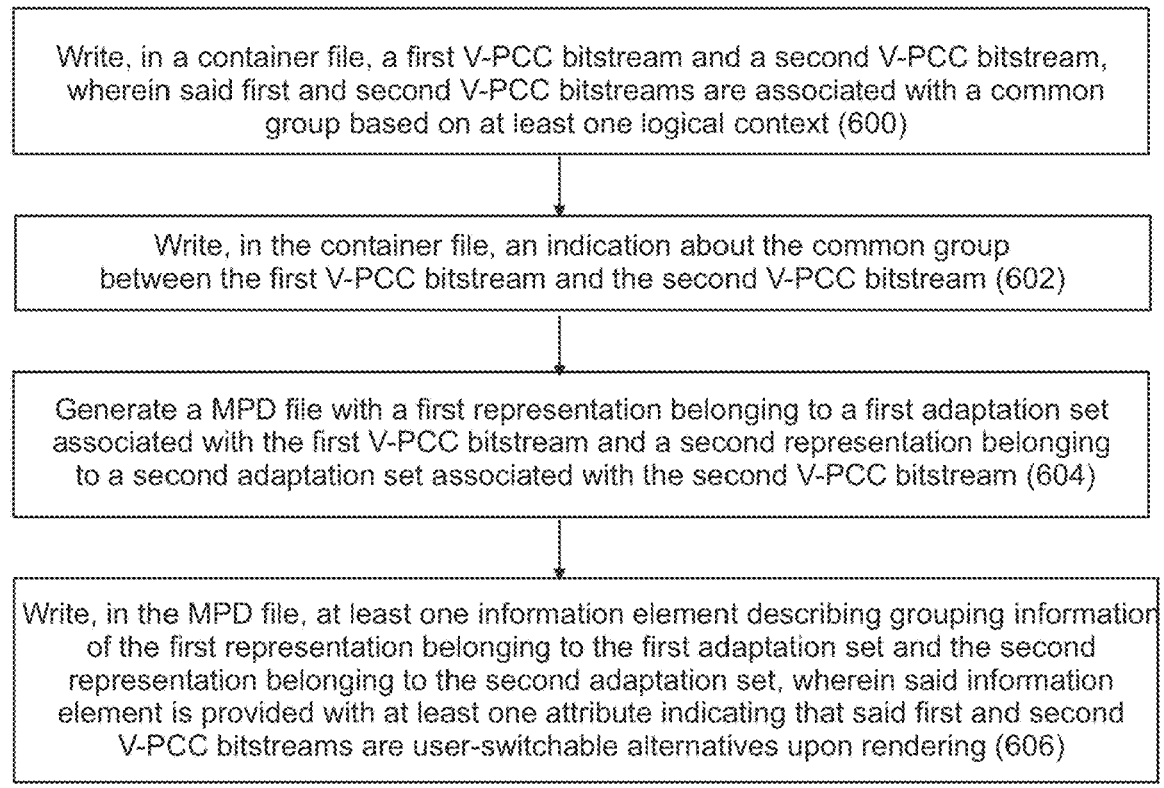
FIG. 6 shows a flow chart of a media file authoring method according to an embodiment of the invention.

The method according to an aspect, as shown in FIG. 6, comprises writing (600), in a container file, a first video-based point cloud compression (V-PCC) bitstream and a second V-PCC bitstream, wherein said first and second V-PCC bitstreams are associated with a common group based on at least one logical context; writing (602), in the container file, an indication about the common group between the first V-PCC bitstream and the second V-PCC bitstream; generating (604) a media presentation description (MPD) file with a first representation belonging to a first adaptation set associated with the first V-PCC bitstream and a second representation belonging to a second adaptation set associated with the second V-PCC bitstream; and writing (606), in the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives upon rendering.

Thus, instead of being able to indicate only that different versions of a particular V-PCC bitstream are alternatives to each upon rendering and playback, the approach enables to indicate that there is a logical context shared by the different V-PCC bitstreams, which enables the user to switch between the different V-PCC bitstreams upon rendering and playback. This provides, besides the content creator with substantially more possibilities for providing alternative representations for playback, but also the user of the playback device with the possibility to carry out switching between the representations of different V-PCC bitstreams, if they have been associated with a common group based on at least one logical context.

According to an embodiment, the method further comprises encapsulating the first and the second V-PCC bitstream in a single-track or in a multi-track container. Thus, the content of each V-PCC bitstream may be represented by a single track or by multiple tracks, which may be mutual alternatives to each other differing from each by one or more properties, such as image quality, bandwidth requirements and/or resources required for playback.

Figure 7:
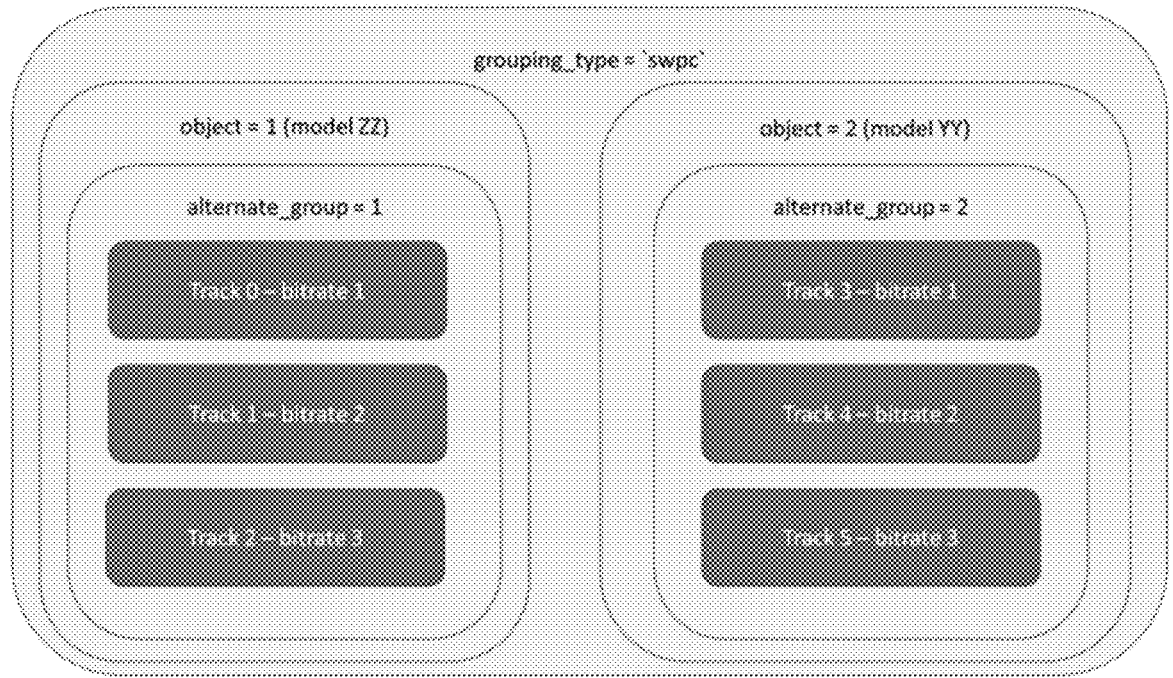
FIG. 7 shows an example of grouping of representations according to an embodiment of the invention.

FIG. 7 shows an example, where alternate media tracks of two V-PCC bitstreams are encapsulated in multi-track containers. The first set of tracks, which may be referred to as alternate_group 1, comprises tracks Track0, Track1, and Track2, which may be mutual alternatives to each other, e.g. based on the bitrate available for streaming or the properties of the playback device. Similarly, the second set of tracks, which may be referred to as alternate_group 2, comprises tracks Track3, Track4, and Track5 being mutual alternatives to each other. However, the V-PCC data of the first set of tracks (alternate_group 1) may at least partially relate to a different object than the V-PCC data of the second set of tracks (alternate_group 2). In terms of the use case example described above, the first object (Object 1) associated with the first set of tracks (alternate_group 1) may relate to the wedding dress as represented by the Model ZZ, whereas the second object (Object 2) associated with the second set of tracks (alternate_group 2) may relate to the wedding dress as represented by the Model YY.

For indicating the logical context underlying the grouping of said objects represented by said two different V-PCC bitstreams as desired by the content creator, the container file is provided with an indication, which may be referred to as user-switchable representations of V-PCC objects (e.g. 'swpc').

According to an embodiment, said indication is configured to be carried out a syntax element defining an entity group. Thus, a new grouping type (e.g. 'swpc') may be specified for the entity group mechanism, for example, as follows.
Definition
Box Type: 'swpc'
Container: GroupsListBox
Mandatory: No
Quantity: Zero or More
Syntax

```
aligned(8) class ObjectSwitchAlternativesBox(version, flags)
    extends EntityToGroupBox('swpc', version, flags) {
}
```

The following semantics may be applied: EntityToGroupBox with grouping_type equal to 'swpc' specifies tracks and items that are user switchable alternative of each other.

According to an embodiment, wherein said indication is configured to be carried out by a syntax element defining user data. Herein, a new grouping type (e.g. 'swpc') may be specified for user data mechanism, for example, as follows.
Definition
Box Type: 'swpc'
Container: UserDataBox of the corresponding TrackBox
Mandatory: No
Quantity: Zero or One The track switching group box is contained in the user data box of the track it modifies.
Syntax

```
aligned(8) class TrackObjectSwitchAlternativesGroupBox
    extends FullBox('swpc', version = 0, 0) {
        template int(32) switch_object_group_id = 0;
}
```

The following semantics may be applied: switch_object_group_id is an integer that specifies a group or collection of tracks. If this field is 0 (default value) or if the TrackObjectSwitchAlternativesGroupBox is absent there is no information on whether group or collection of tracks represents objects that can be switched between each other. If this integer is not 0 it shall be the same for tracks that represent object that can be switched between each other.

According to an embodiment, said indication is configured to be carried out by a syntax element defining a track group. Herein, a new grouping type (e.g. 'swpc') is specified for the track group mechanism as follows.
Definition
Box Type: 'swpc'
Container: TrackGroupBox
Mandatory: No
Quantity: Zero or More
Syntax

```
aligned(8) class TrackObjectSwitchAlternativesGroupBox
    extends TrackGroupTypeBox('tply') {
    // track_group_id is inherited from TrackGroupTypeBox syntax
}
```

The following semantics may be applied: track_group_id is an integer that specifies a group or collection of tracks. If the TrackObjectSwitchAlternativesGroupBox is absent then there is no information on whether group or collection of tracks represents objects that can be switched between each other. track_group_id shall be the same for tracks that represent object that can be switched between each other.

According to an embodiment, the new grouping type and data structures may be defined and present only in V-PCC tracks and V-PCC bitstream tracks. The entity group related definitions may be present in file-level metadata box or track level metadata box.

When streaming the user-switchable representations of V-PCC objects using MPEG-DASH, some changes are required in information elements and their attributes to indicate the user-switchable representations of V-PCC objects.

An EssentialProperty or a SupplementalProperty EntityToGroup element with a @schemeIdUri attribute equal to "urn:mpeg:mpegI:vpcc:2020:etgb" may be referred to as an EntityToGroup descriptor.

One or more EntityToGroup descriptors may be present at period level or at MPD level.

The @value attribute of the EntityToGroup descriptor shall not be present. The EntityToGroup descriptor shall include one or more EntityGroup elements with attributes as specified below in Table 3.

The EntityGroup@group_type equal to 'swpc' specifies a set of Representations of V-PCC objects. Each V-PCC object in the set is intended to be presented as a user-switchable alternative for another V-PCC object in the same entity group.

TABLE 3

Semantics of attributes and elements of EntityToGroup descriptor.

| Elements and Attributes for EntityToGroup descriptor | Use | Description |
|---|---|---|
| EntityGroup | 1 ... N | Container element which specifies an Entity Group. Its sub-element and attributes provide information about the entity group |
| EntityGroup@group_type | M | This attribute is an unsigned integer that identifies the type (i.e. criterion used to form the Entity groups) of the Entity grouping. |
| EntityGroup@group_id | M | This attribute is a non-negative integer assigned to the entity group that shall not be equal to any EntityGroup@group_id value of any other EntityGroup element. |
| EntityGroup.EntityIdList | 1 ... N | The attributes of this element list all the Adaptation Sets and the corresponding Representation Sets which belong to this entity group |
| EntityGroup.EntityIdList@asid | M | Specifies the Adaptation Set ID that belong to the entity group |
| EntityGroup.EntityIdList@rsid | M | Specifies the Representation Set ID present in the Adaptation Set specified by the EntityGroup.EntityIdList@asid which belongs to the entity group |
| EntityGroup@ref_vpcc_id | O | This attribute is a whitespace-separated list of V-PCC object IDs which are user-switchable alternative for another V-PCC object in the same list |

The data types for various elements and attributes may be as defined in an XML schema. An exemplified XML schema is shown below. The schema may be represented in a XML schema that has namespace urn:mpeg:mpegI:vpcc:2020 and is specified as follows:

```
<?xml version="1.0" encoding="UTF-8"?>
<xs:schema xmlns:xs="http://www.w3.org/2001/XMLSchema"
    targetNamespace="urn:mpeg:mpegI:vpcc:2018"
    xmlns:omaf2=" urn:mpeg:mpegI:vpcc:2018"
    elementFormDefault="qualified">
    <xs:import namespace=" urn:mpeg:mpegI:vpcc:2018"
        schemaLocation="VPCC_ISOBMFF.xsd"/>
    <xs:element name="EntityGroup" type="vpcc2:EntityGroupType"/>
    <xs:complexType name="EntityGroupType">
        <xs:sequence>
            <xs:element name="EntityIdList" type="EntityIdType" minOccurs="1" maxOccurs="N"/>
        </xs:sequence>
            <xs:attribute name=" group_type" type="xs:unsignedInt" use="required"/>
            <xs:attribute name=" group_id" type="xs:int" use="required"/>
            <xs:attribute name="ref_overlay_id" type="vpcc:listofUnsignedByte" use="optional"/>
            <xs:anyAttribute processContents="skip"/>
    </xs:complexType>
    <xs:complexType name="EntityIdType">
        <xs:attribute name="asid" type="xs:unsignedInt" use="required"/>
        <xs:attribute name="rsid" type="xs:unsignedInt" use="required"/>
        <xs:anyAttribute namespace="##other" processContents="lax"/>
    </xs:complexType>
</xs:schema>
```

When an Adaptation Set containing an first V-PCC object is associated with one or more Adaptation Sets containing a second V-PCC object (the first V-PCC object and the second V-PCC object being switchable alternatives for each other), an association descriptor shall be present as a child element of the AdaptationSet element containing the first V-PCC object and an association descriptor shall be present as a child element of the AdaptationSet element containing the second V-PCC object.

In this case the association descriptor shall include both of the following:
An XPath string in the Association element which evaluates to one or more AdaptationSet element(s) containing user switchable alternative V-PCC object.

Only one 'swpc' value for the Association@associationKindList attribute of the Association element. In this case:
When Association@associationKindList includes one 'swpc' value and the number of element(s) the XPath string in the Association element above evaluates to is greater than 1, the V-PCC object applies collectively to the user switchable alternative V-PCC object.
When Association@associationKindList includes one 'swpc' value and the number of elements the XPath string in the Association element above evaluates to is equal to 1, the V-PCC object applies individually to the user switchable alternative V-PCC object.

There may be multiple such association descriptors present inside an Adaptation Set containing an V-PCC object. When an Adaptation Set containing an V-PCC object is associated with one or more Adaptation Set(s) containing user switchable alternative V-PCC object as described above, the alternative V-PCC object are intended to be presented alternatively during user switching.

Figure 8:
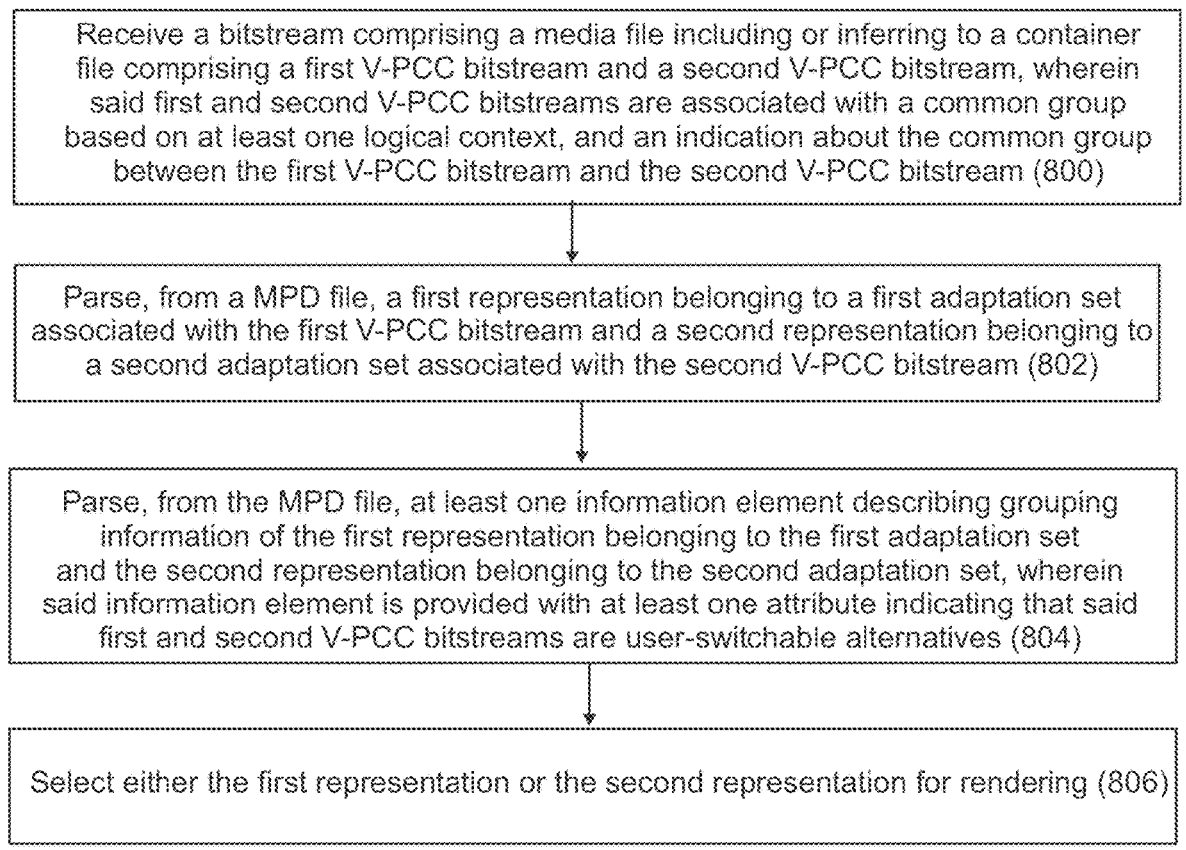
FIG. 8 shows a flow chart of a media file reading method according to an embodiment of the invention.

Another aspect relates to operation of a decoder or a file reader/parser upon receiving the above-described bitstream with said indications. A method, which is shown in FIG. 8, comprises receiving (800) a bitstream comprising a media file including or inferring to a container file comprising a first video-based point cloud compression (V-PCC) bitstream and a second V-PCC bitstream, wherein said first and second V-PCC bitstreams are associated with a common group based on at least one logical context, and an indication about the common group between the first V-PCC bitstream and the second V-PCC bitstream; parsing (802), from a media presentation description (MPD) file, a first representation belonging to a first adaptation set associated with the first V-PCC bitstream and a second representation belonging to a second adaptation set associated with the second V-PCC bitstream; parsing (804), from the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives; and selecting (806) either the first representation or the second representation for rendering.

The above embodiments may be implemented in an apparatus comprising means for writing, in a container file, a first video-based point cloud compression (V-PCC) bitstream and a second V-PCC bitstream, wherein said first and second V-PCC bitstreams are associated with a common group based on at least one logical context; means for writing, in the container file, an indication about the common group between the first V-PCC bitstream and the second V-PCC bitstream; means for generating a media presentation description (MPD) file with a first representation belonging to a first adaptation set associated with the first V-PCC bitstream and a second representation belonging to a second adaptation set associated with the second V-PCC bitstream; and means for writing, in the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives upon rendering.

The file generating aspects may likewise be implemented in an apparatus comprising at least one processor and at least one memory, said at least one memory stored with computer program code thereon, the at least one memory and the computer program code configured to, with the at least one processor, cause the apparatus at least to perform: write, in a container file, a first video-based point cloud compression (V-PCC) bitstream and a second V-PCC bitstream, wherein said first and second V-PCC bitstreams are associated with a common group based on at least one logical context; write, in the container file, an indication about the common group between the first V-PCC bitstream and the second V-PCC bitstream; generate a media presentation description (MPD) file with a first representation belonging to a first adaptation set associated with the first V-PCC bitstream and a second representation belonging to a second adaptation set associated with the second V-PCC bitstream; and write, in the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives upon rendering.

The decoding and/or parsing aspects may be implemented in an apparatus comprising: means for receiving a bitstream comprising a media file including or inferring to a container file comprising a first video-based point cloud compression (V-PCC) bitstream and a second V-PCC bitstream, wherein said first and second V-PCC bitstreams are associated with a common group based on at least one logical context, and an indication about the common group between the first V-PCC bitstream and the second V-PCC bitstream; means for parsing, from a media presentation description (MPD) file, a first representation belonging to a first adaptation set associated with the first V-PCC bitstream and a second representation belonging to a second adaptation set associated with the second V-PCC bitstream; means for parsing, from the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives; and means for selecting either the first representation or the second representation for rendering.

The decoding aspects may likewise be implemented in an apparatus comprising at least one processor and at least one memory, said at least one memory stored with computer program code thereon, the at least one memory and the computer program code configured to, with the at least one processor, cause the apparatus at least to perform: receive a bitstream comprising a media file including or inferring to a container file comprising a first video-based point cloud compression (V-PCC) bitstream and a second V-PCC bitstream, wherein said first and second V-PCC bitstreams are associated with a common group based on at least one logical context, and an indication about the common group between the first V-PCC bitstream and the second V-PCC bitstream; parse, from a media presentation description (MPD) file, a first representation belonging to a first adaptation set associated with the first V-PCC bitstream and a second representation belonging to a second adaptation set associated with the second V-PCC bitstream; parse, from the MPD file, at least one information element describing grouping information of the first representation belonging to the first adaptation set and the second representation belonging to the second adaptation set, wherein said information element is provided with at least one attribute indicating that said first and second V-PCC bitstreams are user-switchable alternatives; and select either the first representation or the second representation for rendering.

Such apparatuses may comprise e.g. the functional units disclosed in any of the FIGS. 1, 2, 4*a*, 4*b*, 5*a* and 5*b* for implementing the embodiments.

Figure 9:
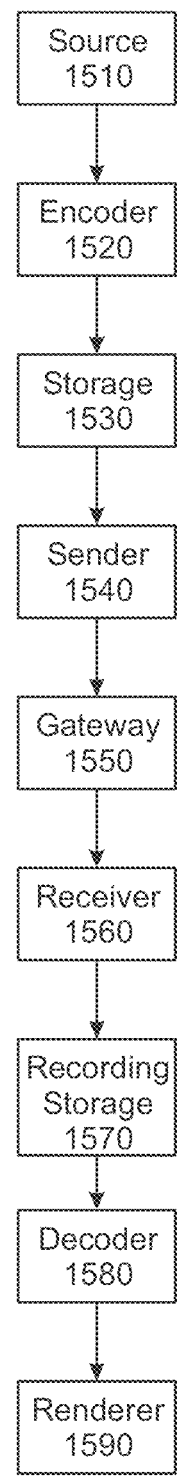
FIG. 9 shows a schematic diagram of an example multimedia communication system within which various embodiments may be implemented.

FIG. 9 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, viewpoint switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Thus, the decoder may comprise means for requesting at least one decoder reset picture of the second representation for carrying out bitrate adaptation between the first representation and a third representation. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described in relation to ISOBMFF. It needs to be understood that embodiments could be similarly realized with any other file format, such as Matroska, with similar capability and/or structures as those in ISOBMFF.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
writing, in a container file, a first video-based point cloud compression bitstream and a second video-based point cloud compression bitstream, wherein said first and second video-based point cloud compression bitstreams are associated with a common group based on at least one logical context;
writing, in the container file, an indication about the common group between the first video-based point cloud compression bitstream and the second video-based point cloud compression bitstream;
generating a dynamic adaptive streaming file with a first representation belonging to a first adaptation set associated with the first video-based point cloud compression bitstream corresponding to a first object, and a second representation belonging to a second adaptation set associated with the second video-based point cloud compression bitstream corresponding to a second object; and
writing, in the dynamic adaptive streaming file, at least one information element describing grouping information of the first representation belonging to the first adaptation set and the second representation belonging to the second adaptation set, wherein said information element is provided with at least one attribute indicating that said first and second video-based point cloud compression bitstreams, corresponding respectively to the first object and the second object, are user-switchable alternatives upon rendering.

2. The method according to claim 1, further comprising encapsulating the first and the second video-based point cloud compression bitstream in a single-track or in a multi-track container.

3. The method according to claim 1, wherein said indication is configured to be carried out with a syntax element defining an entity group.

4. The method according to claim 1, wherein said indication is configured to be carried out with a syntax element defining user data.

5. The method according to claim 1, wherein said indication is configured to be carried out with a syntax element defining a track group.

6. An apparatus comprising at least one processor and at least one non-transitory memory, said at least one memory stored with computer program code thereon, the at least one memory and the computer program code configured to, with the at least one processor, cause the apparatus at least to perform:
write, in a container file, a first video-based point cloud compression bitstream and a second video-based point cloud compression bitstream, wherein said first and second video-basedpoint cloud compression bitstreams are associated with a common group based on at least one logical context;
write, in the container file, an indication about the common group between the first video-based point cloud compression bitstream and the second video-based point cloud compression bitstream;
generate a dynamic adaptive streaming file with a first representation belonging to a first adaptation set associated with the first video-based point cloud compression bitstream corresponding to a first object, and a second representation belonging to a second adaptation set associated with the second video-based point cloud compression bitstream corresponding to a second object; and
write, in the dynamic adaptive streaming file, at least one information element describing grouping infoimation of the first representation belonging to the first adaptation set and the second representation belonging to the second adaptation set, wherein said information element is provided with at least one attribute indicating that said first and second video-based point cloud compression bitstreams, corresponding respectively to the first object and the second object, are user-switchable alternatives upon rendering.

7. The apparatus according to claim 6, wherein the computer program code is configured to cause the apparatus to
encapsulate the first video-based point cloud compression bitstream corresponding to the first object within a first set of tracks, wherein tracks within the first set of tracks belong to a first group associated with the first object, and wherein tracks within the first set of tracks are alternatives to one another; and
encapsulate the second video-based point cloud compression bitstream corresponding to the second object within a second set of tracks, wherein tracks within the second set of tracks belong to a second group associated with the second object, and wherein tracks within the second set of tracks are alternatives to one another.

8. The apparatus according to claim 6, wherein the computer program code is configured to cause the apparatus to
include said indication in a syntax element defining an entity group.

9. The apparatus according to claim 6, wherein the computer program code is configured to cause the apparatus to
include said indication in a syntax element defining user data.

10. The apparatus according claim 6, wherein the computer program code is configured to cause the apparatus to
include said indication in a syntax element defining a track group.

11. A method comprising:
receiving a bitstream comprising a media file including or inferring to a container file comprising a first video-based point cloud compression bitstream and a second video-based point cloud compression bitstream, wherein said first and second video-based point cloud compression bitstreams are associated with a common group based on at least one logical context, and an indication about the common group between the first video-based point cloud compression bitstream and the second video-based point cloud compression bitstream;
parsing, from a dynamic adaptive streaming file, a first representation belonging to a first adaptation set associated with the first video-based point cloud compression bitstream corresponding to a first object, and a second representation belonging to a second adaptation set associated with the second video-based point cloud compression bitstream corresponding to a second object;
parsing, from the dynamic adaptive streaming file, at least one information element describing grouping information of the first representation belonging to the first adaptation set and the second representation belonging to the second adaptation set, wherein said information element is provided with at least one attribute indicating that said first and second video-based point cloud compression bitstreams, corresponding respectively to the first object and the second object, are user-switchable alternatives; and
selecting either the first representation or the second representation for rendering, based on user selection of the first object or the second object.

12. The method according to claim 11, further comprising decapsulating the first and the second video-based point cloud compression bitstream from a single-track or from a multi-track container.

13. The method according to claim 11, further comprising obtaining said indication from a syntax element defining an entity group.

14. The method according to claim 11, further comprising obtaining said indication from a syntax element defining user data.

15. The method according to claim 11, further comprising obtaining said indication from a syntax element defining a track group.

16. An apparatus comprising at least one processor and at least one non-transitory memory, said at least one memory stored with computer program code thereon, the at least one memory and the computer program code configured to, with the at least one processor, cause the apparatus at least to perform:
receive a bitstream comprising a media file including or inferring to a container file comprising a first video-based point cloud compression bitstream and a second video-based point cloud compression bitstream, wherein said first and second video-based point cloud compression bitstreams are associated with a common group based on at least one logical context, and an indication about the common group between the first video-based point cloud compression bitstream and the second video-based point cloud compression bitstream;
parse, from a dynamic adaptive streaming file, a first representation belonging to a first adaptation set associated with the first video-based point cloud compression bitstream corresponding to a first object and a second representation belonging to a second adaptation set associated with the second video-based point cloud compression bitstream corresponding to a second object;
parse, from the dynamic adaptive streaming file, at least one information element describing grouping information of the first representation belonging to the first adaptation set and the second representation belonging to the second adaptation set, wherein said information element is provided with at least one attribute indicating that said first and second video-based point cloud compression bitstreams, corresponding respectively to the first object and the second object, are user-switchable alternatives; and
select either the first representation or the second representation for rendering, based on user selection of the first object or the second object.

17. The apparatus according to claim 16, wherein the computer program code is configured to cause the apparatus to
decapsulate the first video-based point cloud compression bitstream corresponding to the first object from a first set of tracks, wherein tracks within the first set of tracks belong to a first group associated with the first object, and wherein tracks within the first set of tracks are alternatives to one another; and
decapsulate the second video-based point cloud compression bitstream corresponding to the second object from a second set of tracks, wherein tracks within the second set of tracks belong to a second group associated with the second object, and wherein tracks within the second set of tracks are alternatives to one another.

18. The apparatus according to claim 16, wherein the computer program code is configured to cause the apparatus to
obtain said indication from a syntax element defining an entity group.

19. The apparatus according to claim 16, wherein the computer program code is configured to cause the apparatus to
obtain said indication from a syntax element defining user data.

20. The apparatus according to claim 16, wherein the computer program code is configured to cause the apparatus to
obtain said indication from a syntax element defining a track group.

21. A non-transitory computer-readable medium comprising program instructions stored thereon which are configured to, when executed with at least one processor, cause the at least one processor to perform:
write, in a container file, a first video-based point cloud compression bitstream and a second video-based point cloud compression bitstream, wherein said first and second video-based point cloud compression bitstreams are associated with a common group based on at least one logical context;

write, in the container file, an indication about the common group between the first video-based point cloud compression bitstream and the second video-based point cloud compression bitstream;

generate a dynamic adaptive streaming file with a first representation belonging to a first adaptation set associated with the first video-based point cloud compression bitstream corresponding to a first object, and a second representation belonging to a second adaptation set associated with the second video-based point cloud compression bitstream corresponding to a second object; and write, in the dynamic adaptive streaming file, at least one information element describing grouping information of the first representation belonging to the first adaptation set and the second representation belonging to the second adaptation set, wherein said information element is provided with at least one attribute indicating that said first and second video-based point cloud compression bitstreams, corresponding respectively to the first object and the second object, are user-switchable alternatives upon rendering.

22. A non-transitory computer-readable medium comprising program instructions stored thereon which are configured to, when executed with at least one processor, cause the at least one processor to perform:

receive a bitstream comprising a media file including or inferring to a container file comprising a first video-based point cloud compression bitstream and a second video-based point cloud compression bitstream, wherein said first and second video-based point cloud compression bitstreams are associated with a common group based on at least one logical context, and an indication about the common group between the first video-based point cloud compression bitstream and the second video-based point cloud compression bitstream;

parse, from a dynamic adaptive streaming file, a first representation belonging to a first adaptation set associated with the first video-based point cloud compression bitstream corresponding to a first object and a second representation belonging to a second adaptation set associated with the second video-based point cloud compression bitstream corresponding to a second object;

parse, from the dynamic adaptive streaming file, at least one information element describing grouping information of the first representation belonging to the first adaptation set and the second representation belonging to the second adaptation set, wherein said information element is provided with at least one attribute indicating that said first and second video-based point cloud compression bitstreams, corresponding respectively to the first object and the second object, are user-switchable alternatives; and select either the first representation or the second representation for rendering, based on user selection of the first object or the second object.

* * * * *